(12) United States Patent
Chiang

(10) Patent No.: US 7,798,888 B2
(45) Date of Patent: Sep. 21, 2010

(54) DIAMOND WIRE SAW

(76) Inventor: Huei-Chen Chiang, 18, Alley 123, Lane 668, Ying Tao Road, Ying Ko Town, Taipei County (TW)

( * ) Notice: Subject to any disclaimer, the term of this patent is extended or adjusted under 35 U.S.C. 154(b) by 0 days.

(21) Appl. No.: 12/320,021

(22) Filed: Jan. 15, 2009

(65) Prior Publication Data

US 2010/0175677 A1  Jul. 15, 2010

(51) Int. Cl.
*B24B 21/00* (2006.01)
*B28D 1/08* (2006.01)

(52) U.S. Cl. .................. 451/56; 125/16.02; 125/21

(58) Field of Classification Search ............ 451/56, 451/296; 125/21, 22, 16.02, 39, 160.1
See application file for complete search history.

(56) References Cited

U.S. PATENT DOCUMENTS 4,448,655 A * 5/1984 Inoue .................... 205/686

\* cited by examiner

*Primary Examiner*—Robert Rose
(74) *Attorney, Agent, or Firm*—Rosenberg, Klein & Lee

(57) ABSTRACT

A diamond wire saw with an improved structure is provided. The diamond wire saw is capable of cutting operation along curved paths with small radii of curvature. In addition, the diamond wire saw is configured to prevent a diamond particle layer covering a surface thereof from flaking off. Thus, the diamond wire saw has improved durability and enhanced sharpness as well as low production cost.

2 Claims, 2 Drawing Sheets

DIAMOND WIRE SAW

BACKGROUND OF THE INVENTION

1. Technical Field

The present invention relates to diamond wire saws and, more particularly, to a diamond wire saw with an improved structure capable of cutting various rigid or super rigid materials.

2. Description of Related Art

Known diamond wire saws mainly included the following two types.

The first type uses a metal-plated layer to wrap and thereby secure diamond particles to a surface of a metal cable, so as to form a wire saw functioning as a tool for cutting rock, quartz, silicon crystal, and other highly rigid materials. In a diamond wire saw having the aforesaid structure; the metal-plated layer which wraps and secures the diamond particles to a surface of the wire saw is rigid and thus renders the wire saw unsuitable for cutting along curved paths with small radii of curvature. In addition, the metal-plated layer tends to flake off so that the diamond wire saw is no more serviceable.

The second type refers to a wire saw composed of sintered metal bonded diamond beads, wherein countless such diamond beads, each formed with a through hole, are stringed together by a pliable yet strong cord. This type of wire saw is disadvantaged by its relatively large cord diameter, which leads to a kerf typically more than 11 mm in width. In addition, this type of wire saw is also unmanageable when operated along curved cutting paths with small radii of curvature and incurs a considerable production cost.

SUMMARY OF THE INVENTION

In view that the shortcomings of the prior art require immediate improvement, the inventor of the present invention, based on years of experience in the related industry, strived to figure out ways to make a wire saw which is manageable when operated along curved cutting paths with small radii of curvature, incurs a low manufacturing cost, requires a minimum amount of material, and has a long service life. After repeated experiments and extensive research, the inventor finally succeeded in developing a diamond wire saw with an improved structure.

The disclosed diamond wire saw features an improved structure manageable when operated along curved cutting paths with small radii of curvature. More particularly, in addition to being suitable for cutting along curved paths with small radii of curvature, the disclosed diamond wire saw has a diamond-studded metal-plated layer unlikely to flake off, possesses improved durability, provides excellent cutting effects, and requires a reduced manufacturing cost.

The disclosed diamond wire saw comprises a cord having an outer surface covered by an insulating material. The insulating material in turn has a surface covered by a net, wherein the net is formed by interlaced metal wires and insulating wires.

In the above structure, the metal-plated layer is developed through an electroplating process so as to wrap and secure diamond particles on a surface of the net and thus form the diamond wire saw. During the electroplating process, the metal wires of the net bind with the accumulating metal-plated layer that wraps the diamond particles whereas the insulating wires of the net are electrically non-conductive and thus do not bind with the metal-plated layer. Therefore, the metal-plated layer extends only up to two lateral sides of the insulating wires and is movably engaged with but not affixed to the insulating wires, thereby endowing the diamond wire saw with flexibility. With the diamond particles sized between 0.7 mm (#30) and 0.04 mm (40 micron), the wire saw has a diameter below 0.3 mm.

BRIEF DESCRIPTION OF THE DRAWINGS

The invention as well as a preferred mode of use, further objectives, and advantages thereof will be best understood by reference to the following detailed description of an illustrative embodiment when read in conjunction with the accompanying drawings, wherein.

DETAILED DESCRIPTION OF THE PREFERRED EMBODIMENTS

Figure 1:
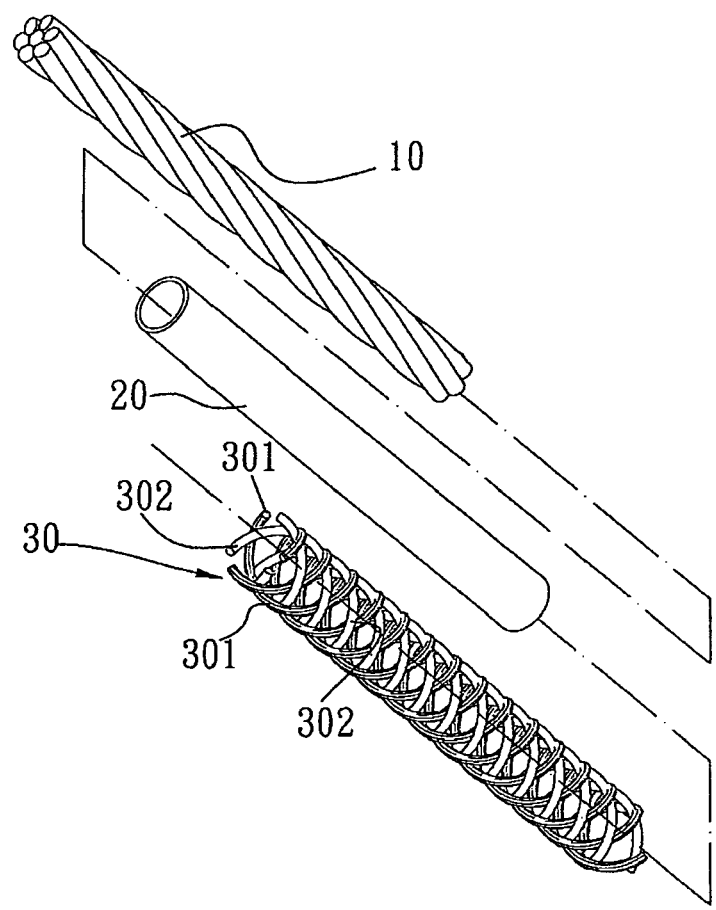
FIG. 1 is an exploded perspective view of a diamond wire saw according to the present invention.

Please refer to FIG. 1 for an exploded perspective view of a diamond wire saw according to the present invention. As can be seen in the drawing, the diamond wire saw comprises a cord 10 having an outer surface covered by an insulating material 20 (also seen in FIG. 2). The insulating material 20 has an outer surface further covered by a net 30.

The insulating material 20 is closely attached to the outer surface of the cord 10 for providing an insulating effect and preventing chemicals used in a later electroplating process from permeating into the cord 10.

The net 30 is formed by metal wires 301 and insulating wires 302 which are interlaced into any possible net-shaped configurations. Therein, quantitative proportions of the metal wires 301 and of the insulating wires 302 used to form the net 30 are variable with practical needs.

Figure 2:
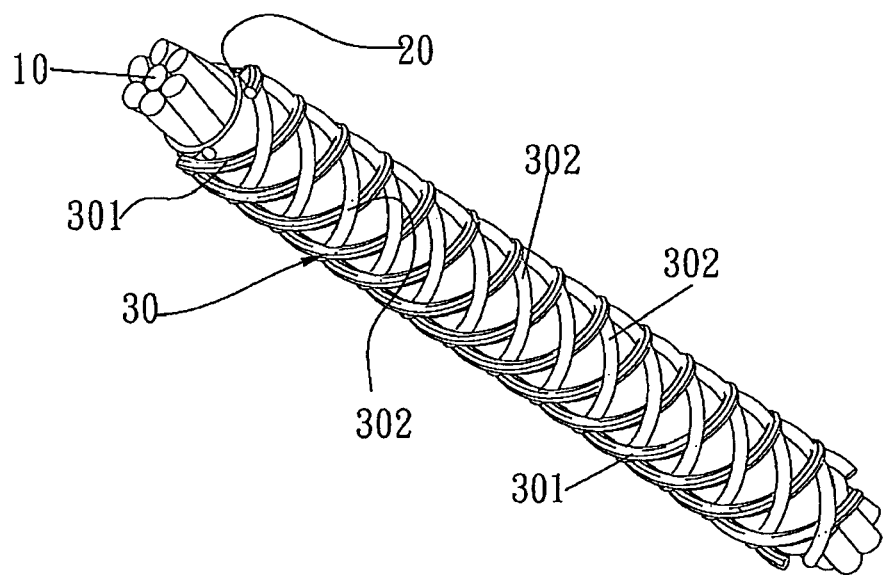
FIG. 2 is a perspective view of a semi-finished diamond wire saw according to the present invention where diamond particles are yet to be provided through an electroplating process.
Figure 3:
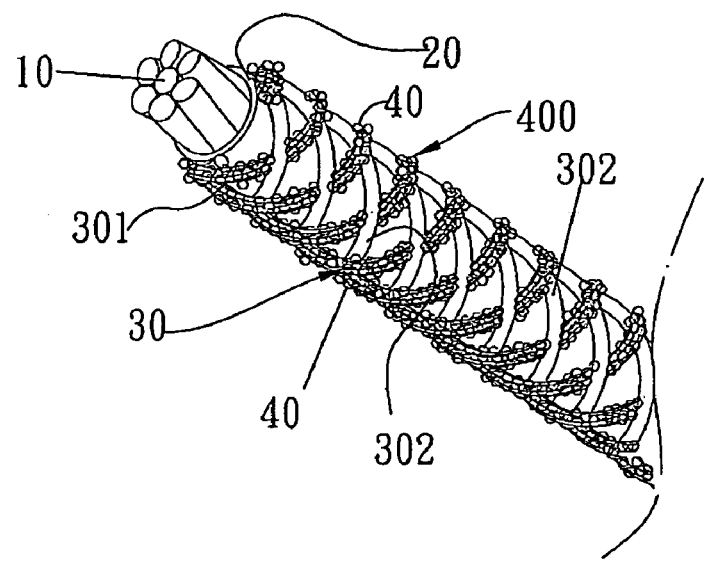
FIG. 3 is a perspective view of the diamond wire saw according to the present invention.
Figure 4:
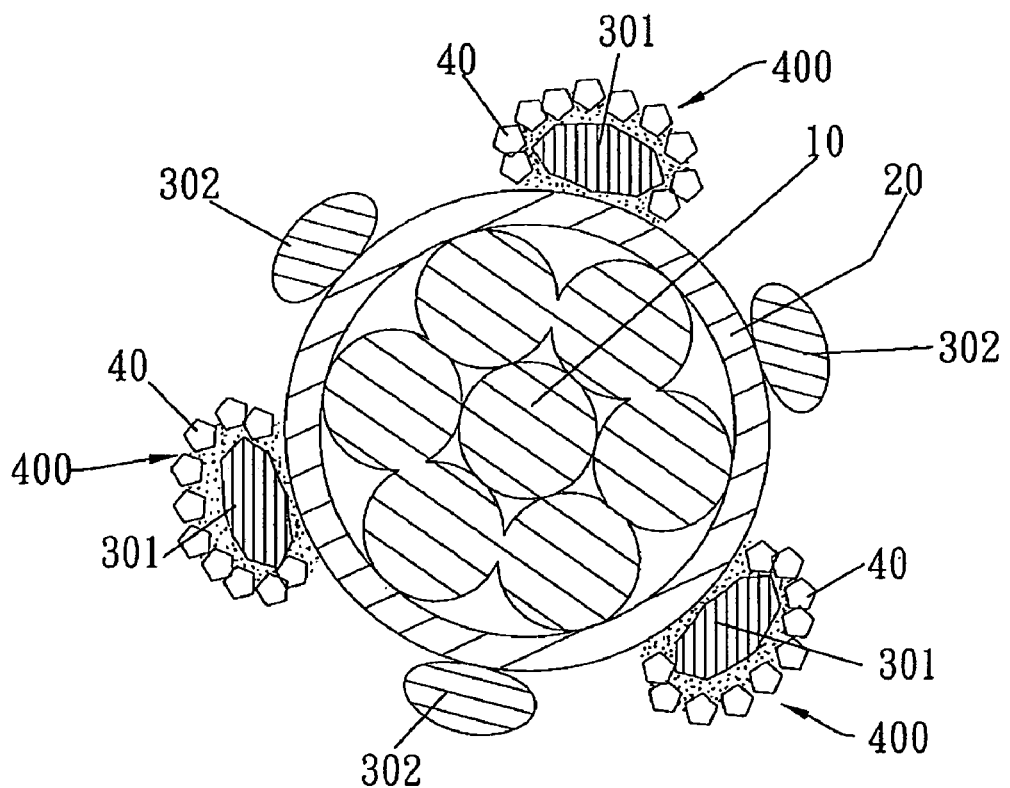
FIG. 4 is a cross-sectional view of the diamond wire saw according to the present invention.

Referring to FIG. 2, the cord 10 has its outer surface covered by the insulating material 20. Then, the outer surface of the insulating material 20 is further covered by the net 30. Afterward, an electroplating process is applied to the net 30 so as to coat a diamond particle layer 400 onto the net 30, as shown in FIGS. 3 and 4. The diamond particle layer 400 is coated on each of the metal wires 301 of the net 30 by the electroplating process. The diamond particle layer 400 is formed by electroplating each of the metal wires 301 of the net 30 so that a metal-plated layer gradually accumulates on each of the metal wires 301 up to a predetermined depth to wrap and secure diamond particles 40 in place. During the electroplating process, the insulating wires 302 of the net 30 are electrically non-conductive and cannot bind with the metal-plated layer of the diamond particle layer 400. Therefore, the metal-plated layer of the diamond particle layer 400 extends only up to two lateral sides of the insulating wires 302 and is movably engaged with but not affixed to the insulating wires 302 so that the resultant diamond wire saw is endowed with flexibility, and the diamond particle layer 400 is secured from chipping and coming off the net 30.

In conclusion, the present invention has been demonstrated to achieve the intended function, has not been put to public use, and therefore meets the requirements of utility and novelty for patent application. Hence, an application for patent for the present invention has been lawfully filed for examination.

The present invention has been described by reference to the preferred embodiment, which is provided for illustrative purposes only and not intended to limit the scope of the present invention. All changes made to the embodiment which are based on the concept of the present invention and whose functions and effects do not depart from the spirit of the present invention as disclosed herein should be encompassed by the appended claims.

What is claimed is:

1. A diamond wire saw, comprising a cord whose outer surface is covered by an insulating material, the insulating material having an outer surface further covered by a net for being coated by a diamond particle layer through an electroplating process;

wherein the net is formed by interlaced metal wires and insulating wires, and the electroplating process is applied to the net to form the diamond particle layer thereon; and wherein each said metal wire of the net is electroplated so that a metal-plated layer accumulates on each said metal wire up to a predetermined depth to wrap and secure diamond particles in place and form the diamond particle layer, whereas the insulating wires of the net are electrically non-conductive and do not bind with the metal-plated layer of the diamond particle layer during the electroplating process, such that the metal-plated layer of the diamond particle layer extends only up to two lateral sides of the insulating wires and is movably engaged with but not affixed to the insulating wires, thereby rendering the diamond wire saw flexible.

2. The diamond wire saw of claim 1, wherein the insulating material is closely attached to the outer surface of the cord for providing an insulating effect and preventing chemicals used in the electroplating process from permeating into the cord.

* * * * *